(12) United States Patent
Lee et al.

(10) Patent No.: US 12,140,574 B2
(45) Date of Patent: Nov. 12, 2024

(54) DUAL INDENTATION TEST METHOD

(71) Applicant: SOGANG UNIVERSITY RESEARCH & BUSINESS DEVELOPMENT FOUNDATION, Seoul (KR)

(72) Inventors: Hyung Yil Lee, Goyang-si (KR); Karuppasamy Pandian Marimuthu, Seoul (KR)

(73) Assignee: SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 17/894,448

(22) Filed: Aug. 24, 2022

(65) Prior Publication Data

US 2023/0067408 A1    Mar. 2, 2023

(30) Foreign Application Priority Data

Aug. 25, 2021    (KR) .................. 10-2021-0112717

(51) Int. Cl.
  *G01N 3/34*    (2006.01)
  *G01N 3/48*    (2006.01)
(52) U.S. Cl.
  CPC ............. *G01N 3/34* (2013.01); *G01N 3/48* (2013.01)
(58) Field of Classification Search
  CPC .... G01N 3/34; G01N 3/48; G01N 2203/0075; G01N 2203/0076; G01N 2203/0208; G01N 3/42; G01N 2203/0069; G01N 3/44

USPC ........ 73/12.09–12.14, 78–84, 788–793, 806, 73/808, 813, 818, 823, 863.41
See application file for complete search history.

(56) References Cited

U.S. PATENT DOCUMENTS

| | | | | |
|---|---|---|---|---|
| 4,435,976 A | * | 3/1984 | Edward, Jr. ............ | G01N 3/44 73/83 |
| H1456 H | * | 7/1995 | Jero .............................. | 73/845 |
| 5,571,954 A | * | 11/1996 | Ernst ...................... | G01N 3/42 324/693 |

(Continued)

FOREIGN PATENT DOCUMENTS

| | | | | |
|---|---|---|---|---|
| EP | 2645080 A2 | * | 10/2013 | ............ G01N 3/068 |
| GB | 2525857 A | * | 11/2015 | ............ G01N 3/068 |

(Continued)

OTHER PUBLICATIONS

Rickhey, F. et al. "A contact size-independent approach to the estimation of biaxial residual stresses by Knoop indentation" Materials and Design 84 (2015) 300-312.

(Continued)

*Primary Examiner* — Robert R Raevis
(74) *Attorney, Agent, or Firm* — Westman, Champlin & Koehler, P.A.; Amanda M. Prose (57) ABSTRACT

A dual indentation test method according to an aspect of the present disclosure may include a first indentation step of indenting a surface of a material using a flat first indenter and a second indentations step of indenting the surface of the material indented by the first indenter using a second indenter.

10 Claims, 7 Drawing Sheets

(56) References Cited

U.S. PATENT DOCUMENTS

| | | | | |
|---|---|---|---|---|
| 6,718,820 B2* | 4/2004 | Kwon | ............... | G01N 3/48 |
| | | | | 73/83 |
| 6,851,300 B2* | 2/2005 | Kwon | ............... | G01N 3/48 |
| | | | | 73/85 |
| 6,945,097 B2* | 9/2005 | Jardret | ............... | G01N 3/46 |
| | | | | 73/806 |
| 6,978,664 B1* | 12/2005 | Uchic | ............... | B82Y 35/00 |
| | | | | 73/85 |
| 7,096,720 B2* | 8/2006 | Hayashi | ......... | G01N 35/00594 |
| | | | | 73/78 |
| 2016/0178498 A1* | 6/2016 | Hess | ............ | E21B 47/007 |
| | | | | 73/83 |
| 2022/0207218 A1* | 6/2022 | Lu | ............ | G06N 3/08 |

FOREIGN PATENT DOCUMENTS

| | | |
|---|---|---|
| JP | 2006162279 A | 6/2006 |
| JP | 2013-019782 A | 1/2013 |
| KR | 20030009665 A | 2/2003 |
| KR | 20150132632 A | 11/2015 |
| KR | 10-1707492 B | 2/2017 |

OTHER PUBLICATIONS

Lee, H., et al. "A numerical approach to spherical indentation techniques for material property evaluation" Journal of the Mechanics and Physics of Solids 35 (2005) 2037-2069.

Lee, J. H., et al. "A study on robust indentation techniques to evaluate elastic-plastic properties of metals" International Journal of Solids and Structures 47 (2010) 647-664.

Marimuthu, K.P. et al. "Dual flat-spherical indentation for extracting elastic-plastic properties from rough metallic surfaces" Materials and Design 208 (2021).

Kim, J. Y. et al. "Characterization of Properties of Micro/Nano Materials Using Nanoindentation and its Applications" Electronic Materials Letters vol. 2 No. 2 (2006) 139-149, with English Abstract.

Kim, M. et al. "Spherical indentation method to evaluate material properties of high-strength materials" Int. J. Mech. Sci. 106 (2016) 117-127.

Notice of Reasons for Rejection for Korean Patent Application No. 10-2021-0112717, dated Jul. 30, 2024.

* cited by examiner

DUAL INDENTATION TEST METHOD

CROSS-REFERENCE TO RELATED APPLICATION

This application claims priority to and the benefit of Korean Patent Application No. 10-2021-0112717 filed in the Korean Intellectual Property Office on Aug. 25, 2021, the entire contents of which are incorporated herein by reference.

TECHNICAL FIELD

The present disclosure relates to a dual indentation test method.

BACKGROUND

An indentation test is used as one of the tests for measuring properties of materials such as hardness and Young's modulus. An indentation test method can provide a load-displacement curve by measuring a load and an indentation depth in real time while applying a load to the surface of a material using an indenter. It is possible to evaluate mechanical properties of the material through analysis of the measured load-displacement curve. An indentation test method can replace existing test methods for evaluating stability and integrity of a structure. Since an indentation test has a simple test procedure and leaves only a small trace on the surface of a material, so it has an advantage that it is possible to measure mechanical properties direct at site through a non-destructive mechanical test method.

An indentation test generates a similar result to existing test results at a laboratory level, but there is a tendency that the rest result is distributed when an intention test is performed on materials with a rough surface. Accordingly, the indentation test data should be examined in comparison to existing test methods such as tension, compression data, etc. A sample having a flat and smooth surface is ideally required to generate reliable data, but surface machining processes such as polishing and grinding cause residual stress, so they may locally change a stress state of an indentation test region. For this reason, an indentation test method is still used under certain restrictions in the industrial application field in spite of several advantages.

SUMMARY

In order to solve the problems described above, an object of the present disclosure is to provide an indentation test method of performing a main indentation test after performing an indentation step that uses a flat indenter before the main indentation test.

A dual indentation test method according to an aspect of the present disclosure may include a first indentation step of indenting a surface of a material using a flat first indenter and a second indentations step of indenting the surface of the material indented by the first indenter using a second indenter.

The second indenter may be different in shape from the first indenter.

A first load-displacement curve may be obtained through the second indentation step.

The first indenter and the second indenter may be higher in rigidity, strength, and hardness than the material.

The first indenter may have a cylindrical shape.

The first indenter may have a diameter that is at least three or more times a spherical diameter of the second indenter.

A plurality of first load-displacement curves may be obtained by repeatedly perform the first indentation step and the second indentation step at least two or more times.

An indentation load and indentation displacement in the first indentation step may be changed in accordance with an error range by comparing the plurality of first load-displacement curves.

The dual indentation test method according to an aspect of the present disclosure may further include a conversion step of converting the first load-displacement curve into a stress-strain curve.

The dual indentation test method according to an aspect of the present disclosure may further include a first calculation step of calculating properties of the material from the stress-strain curve.

The dual indentation test method according to an aspect of the present disclosure may further include a comparing step of comparing the first load-displacement curve with a second load-displacement curve measured from a stress-free surface of the material in a non-stress state.

The dual indentation test method according to an aspect of the present disclosure may further include a second calculation step of calculating a direction and a magnitude of stress by comparing the first load-displacement curve and the second load-displacement curve.

The dual indentation test method according to an aspect of the present disclosure, as described above, can prevent a test result of an indentation test from being distributed for a material with a rough surface.

DETAILED DESCRIPTION

The present disclosure may be modified in various ways and implemented by various exemplary embodiments, so that specific exemplary embodiments are shown in the drawings and will be described in detail herein. However, it is to be understood that the present disclosure is not limited to the specific exemplary embodiments, but includes all modifications, equivalents, and substitutions included in the spirit and the scope of the present disclosure.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Hereinafter, exemplary embodiments of the present invention will be described in detail with reference to the accompanying drawings. It should be noted that like components are indicated by like reference numerals. Functions and configurations that may make the subject matter of the present invention unclear, the detailed description is omitted. Similarly, some components are exaggerated or schematically shown in the drawings.

Hereafter, a dual indentation test method according to an embodiment of the present disclosure is described.

Figure 1:
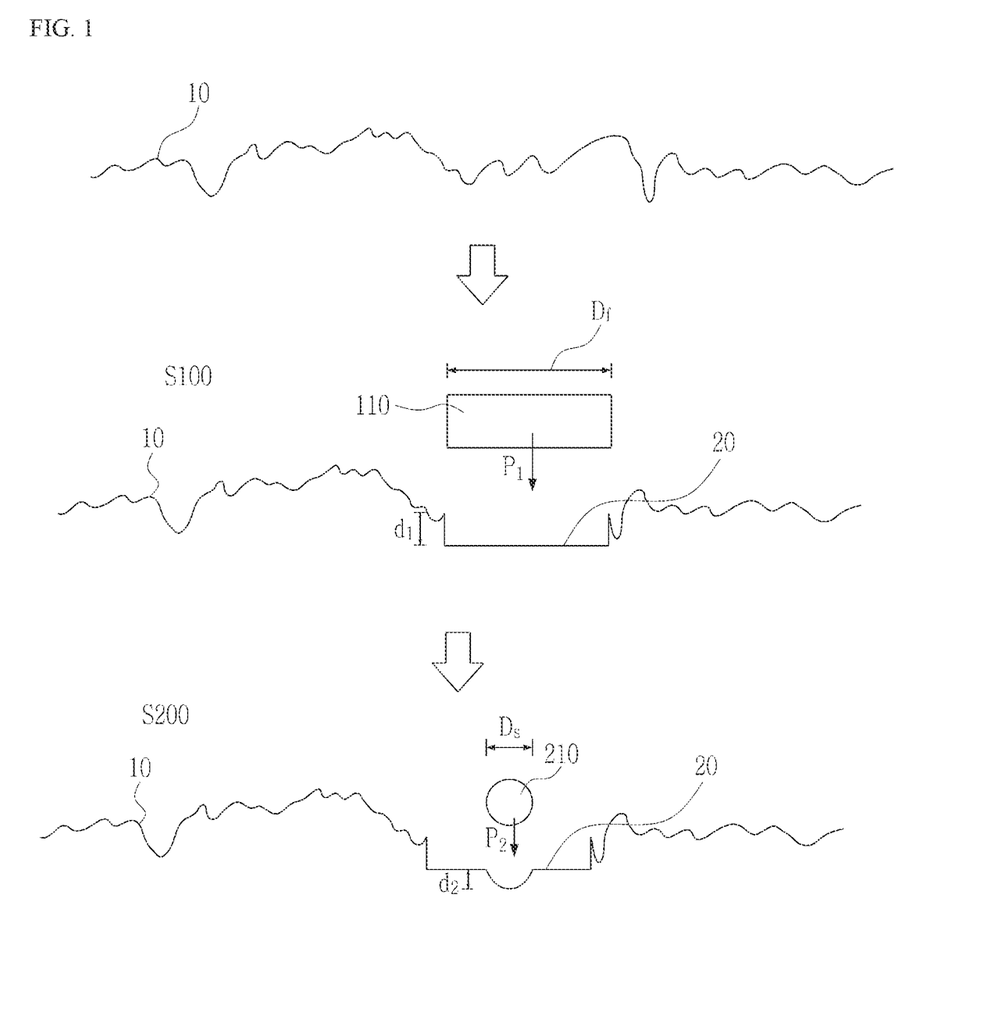
FIG. 1 is a view schematically showing a dual indentation test method according to a first embodiment of the present disclosure.

FIG. 1 is a view schematically showing a dual indentation test method according to a first embodiment of the present disclosure.

Referring to FIG. 1, a dual indentation test method according to an embodiment of the present disclosure may include a first indentation step S100 and a second indentation step S200. The surface of a material is made smooth in the first indentation step S100 and then an indentation test is performed in the second indentation step S200, so an indentation test can be performed even if the surface of a material is not smooth.

Accordingly, it is possible to evaluate structural integrity by measuring a residual stress state and mechanical properties without collecting a specific sample at site. Further, it is possible to omit a process taking considerable time and cost such as mechanical polishing for surface finishing by using a minimum surface machining process.

Further, it is possible to induction of residual stress and a local stress state change of a test region due to mechanical machining. By using an indentation test method, it is possible to monitor variation of mechanical properties and a stress state according to work condition and temperature. It would be understood by those skilled in the art that common steps other than the steps shown in FIG. 1 may be further included in the dual indentation test method.

The first indentation step S100 can indent the surface of a material using a flat first indenter 100 before performing the second indentation step S200 to be described below. The first indentation step S100 can indent a rough surface 10 by a first indentation depth d1 by applying a first indentation load P1 using the first indenter 110. The first indentation step S100 may be plan indentation. By performing the first indentation step S100 before the second indentation step S200, plastic deformation is generated on the rough surface 10 and it is possible to locally reduce surface roughness $R_a$. The surface of a material is made smooth through the first indentation step S100, and accordingly, indentation test data that are reliable and can be reproduced can be obtained. The first indentation step S100 can minimize generation of residual stress and local deformation of the stress state of a material due to mechanical machining and grinding.

The first indenter 110 is an indenter with a flat end and may be used in the first indentation step S100. The first indenter 110 may be higher in rigidity, strength, and hardness than test materials. In this case, the test materials mean materials that undergo the first indentation step S100 and the second indentation step S200. A material with high strength such as tungsten carbide and diamond may be used for the first indenter 110. The shape of the first indenter 110 may be different from the shape of a second indenter 210. The first indenter 110 may have a cylindrical shape of which the portion that comes in contact with the surface of a material is flat.

A first diameter Df may be determined in consideration of the relationship with a second diameter Ds. The first diameter Df may be at least 3 or more times the second diameter Ds. When the rough surface of a material is indented by the first indenter 110, a high residual stress variation and an inclination effect may be shown at the boundary between a planarized surface 20 and a non-planarized surface by the first indentation step S100. In order to reduce this, the second indentation step S200 should be performed at the center of the planarized surface 20 to which the first indentation step S100 is applied, and a predetermine gap distance may be needed at the boundary between the planarized surface 20 by the first indentation step S100 and the non-planarized surface. When the first diameter Df is 3 or more times the second diameter Ds, the surface 20 planarized by the first indentation step S100 may be sufficiently wide. Accordingly, the second indenter 210 can be indented at the center of the surface planarized freely from a residual stress variation and an inclination effect at the boundary.

The first indentation depth d1 may mean a degree at which the first indenter 110 is indented into the rough surface 10 while generating plastic deformation of making the rough surface 10 flat. The first indentation depth d1 may be determined in consideration of a property, such as the strength of a material, and the surface roughness $R_a$, a residual stress state, etc. of a material. The first indentation depth d1 may be set as a depth that is enough to obtain reliable indentation data by reducing influence on the surface roughness $R_a$ on the first load-displacement curve to be described below. However, the first indentation depth d1 is not necessarily limited thereto and may be changed in the range that can be employed by those skilled in the art.

The first indentation load P1 may mean a force that is applied to the surface of a material by the first indenter 110 when the first indentation step S100 is performed. The first indentation load P1 may be determined in consideration of a property, such as the strength of a material, and the surface roughness $R_a$, a residual stress state, etc. of a material. The first indentation load P1 may be set as a load that is enough to obtain reliable indentation data by reducing influence on the surface roughness $R_a$ on the first load-displacement curve to be described below. However, the first indentation load P1 is not necessarily limited thereto and may be changed in the range that can be employed by those skilled in the art.

The second indentation step S200 can measure in real time displacement according to a load by inserting the second indenter 210 while applying a load to a material with the second indenter 210. The second indentation step S200 can indent the planarized surface 20 by a second indentation depth d2 by applying a second indentation load P2 using the second indenter 210. However, when the second indentation step S200 is performed on the rough surface 10, the test result is distributed, so there may be no repeated reproduction. Accordingly, the second indentation step S200 may be performed after planarizing the rough surface 10 through the first indentation step S100.

The first load-displacement curve can be obtained through the second indentation step S200. In this case, the first load-displacement curve is a curve shown by continuously measuring a load and displacement while indentation of the second indentation step S200 is performed. In the second indentation step S200, the second indentation load P2 is applied to the planarized surface 20 through the second indenter 210, and accordingly, indentation generated on the planarized surface can be observed.

The second indenter 210 may be used in the second indentation step S200 as an indenter that is indented in the planarized surface 20 after the first indentation step S100. The second indenter 210 may be higher in rigidity, strength, and hardness than test materials. In order to reduce influence by limit elastic deformation of the second indenter 210 on the first load-displacement curve, a material such as tungsten carbide and diamond may be used for the second indenter 210. The shape of the second indenter 210 may be different from the shape of the first indenter 110. The second indenter 210 may have various shapes of which the end that comes in contact with the surface of a material is narrow. For example, the second indenter 210 may be a spherical indenter, a conical indenter, a pyramid indenter, a Vickers indenter, and a Knoop indenter.

A second diameter Ds may be determined in consideration of the relationship with the first diameter Df. A second diameter Ds may be ⅓ or less of the first diameter Df. Only when the second diameter Ds is small, the second indentation step S200 can be performed on the surface spaced a predetermined distance apart from the boundary between the rough surface 10 and the planarized surface 20.

The second indentation depth d2 may mean a degree at which the second indenter 210 is indented into the planarized surface 20 while generating plastic deformation. The second indentation depth d2 may be measured in real time in the second indentation step S200. The second indentation depth d2 may correspond to displacement on the first load-displacement curve.

The second indentation load P2 may mean a force that is applied to the planarized surface 210 by the second indenter 210 when the second indentation step S200 is performed. The second indentation load P2 may be continuously changed in accordance with a material to be measured and conditions. For example, when the second indentation step S200 is performed, the second indentation load P2 may be continuously changed while having a value of 2 N (Newton) or more and 30 KN or less. When the second indentation step S200 is performed within a smaller range, the second indentation load P2 may be continuously changed in a range less than 2 N. However, the second indentation load P2 is not necessarily limited thereto and may be locally changed in the range that can be employed by those skilled in the art.

A plurality of first load-displacement curves may be obtained by repeatedly performing the first indentation step S100 and the second indentation step S200 at least two or more times. It is possible to check whether they are stable test data that are not influenced by the surface roughness Ra of the rough surface 100 by performing the first indentation step S100 and the second indentation step S200 several time under the same first indentation load P1 and the same first indentation depth d1. For example, it is possible to obtain five first load-displacement curves by setting the first indentation load P1 as 10 KN or the first indentation depth d1 as 100 μm and performing the first indentation step S100 and the second indentation step S200 five times. It is possible to check whether they are stable test data by checking the error range of the five first load-displacement curve data.

The first indentation load P1 and the first indentation depth d1 may be changed in accordance with the error range by comparing a plurality of first load-displacement curves in the first indentation step S100. When the error range of the first load-displacement curve data is large, it is possible to determine that the test result was distributed by influence of the surface roughness Ra because planarization was not sufficiently made in the first indentation step S100. In this case, it is possible to repeatedly perform the first indentation step S100 and the second indentation step S200 by increasing the first indentation load P1 or increasing the first indentation depth d1. For example, it is possible to obtain five first load-displacement curves by setting the first indentation load P1 as 10 KN or the first indentation depth d1 as 100 μm and performing the first indentation step S100 and the second indentation step S200 five times. When the error range of the five first load-displacement curve data exceeds 5%, it is possible to perform the first indentation step S100 and the second indentation step S200 by changing the first indentation load P1 into 15 KN or the first indentation depth d1 into 150 μm.

Figure 2:
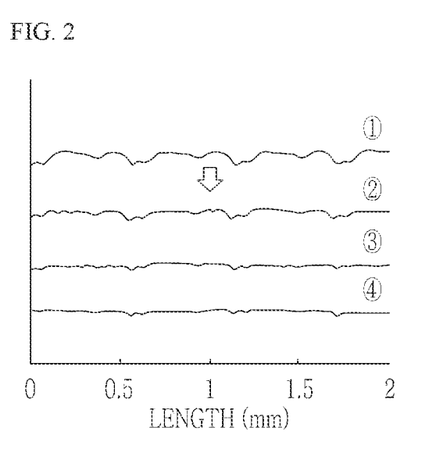
FIG. 2 is a view comparing surfaces of materials according to an indentation load of the dual indentation test method according to the first embodiment of the present disclosure.

FIG. 2 is a view comparing surfaces of materials according to the first indentation load P1 of the dual indentation test method according to the first embodiment of the present disclosure.

Referring to FIG. 2, the graph ① shows an initial machining surface of stainless steel (STS 304) of which the surface roughness $R_a$ is 3.8 μm. The graph ② shows a surface when the surface is indented under a first indentation load P1 of 10 kN using a first indenter 110 of which the first diameter Df is 3 mm, in which the surface roughness Ra is 2.1 μm. The graph ③ shows a surface when the surface is indented under a first indentation load P1 of 15 kN using a first indenter 110 of which the first diameter Df is 3 mm, in which the surface roughness Ra is 1.2 μm. The graph ④ shows a surface when the surface is indented under a first indentation load P1 of 20 kN using a first indenter 110 of which the first diameter Df is 3 mm, in which the surface roughness Ra is 0.9 μm.

It can be seen from the graphs ① to ④ that when the first indentation step S100 is performed, the rough surface 10 is greatly plastically deformed under a high contact pressure under the flat first indenter 110, so the surface roughness $R_a$ is locally reduced. Further, as the magnitude of the first indentation load P1 is increased from 10 kN to 15 kN and 20 kN, the surface roughness is gradually decreased to 2.1 μm, 1.2 μm, and 0.9 μm, so it can be seen that as the magnitude of the first indentation load P1 increases, the surface roughness decreases.

Figure 3:
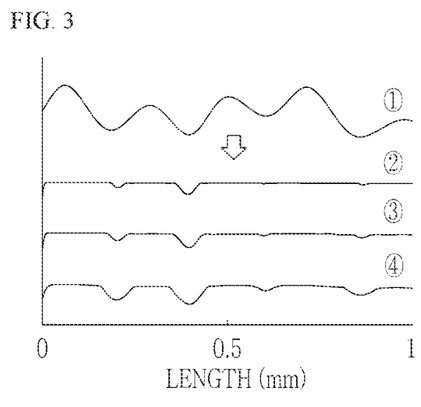
FIG. 3 is a view comparing surfaces according to properties of materials in the dual indentation test method according to the first embodiment of the present disclosure.

FIG. 3 is a view comparing surfaces according to properties of materials in the dual indentation test method according to the first embodiment of the present disclosure.

Referring to FIG. 3, the graph ① is the initial surface shape of a test material. In this case, the graph ① shows only the initial surface shape of the test material, and the elastic limit stress and the strain hardening exponent n are the same as those of the graphs ② to ④. The graph ② is a surface when the first indentation step S100 was performed on a test material, of which the elastic limit stress is 200 MPa and the strain hardening exponent 'n' is 20, under a first diameter Df of 3 mm and a maximum first indentation depth d1 of 100 μm using the first indenter 110. The graph ③ is a surface when the first indentations step S100 was performed on a test sample, of which the elastic limit stress is 400 MPa and the strain hardening exponent 'n' is 10, under the same conditions as the graph ②. The graph ④ is a surface when the first indentations step S100 was performed on a test sample, of which the elastic limit stress is 800 MPa and the strain hardening exponent 'n' is 5, under the same conditions as the graph ②

Referring to the graphs ① to ④, it is possible to planarized surfaces 20 when material properties are different under the same first indentation depth d1 and first diameter Df. It can be seen that the material having low strength of the graph ② was greatly plastically deformed in comparison to the material having high strength of the graph ④, so the degree of planarization is high.

Figure 4:
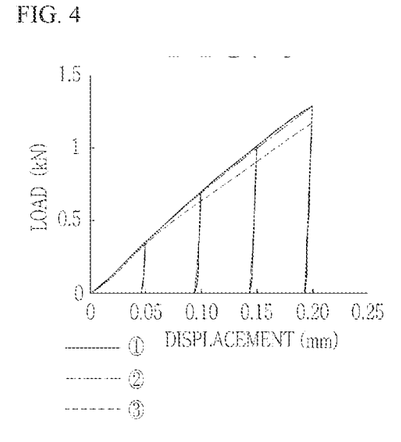
FIG. 4 is a view comparing first load-displacement curves according to a first indentation depth in the dual indentation test method according to the first embodiment of the present disclosure.

FIG. 4 is a view comparing first load-displacement curves according to a first indentation depth d1 in the dual indentation test method according to the first embodiment of the present disclosure.

Referring to FIG. 4, the graph ① is a first load-displacement curve when the first indentation step S100 was performed under elastic limit stress of 400 MPa, a strain hardening exponent 'n' of 10, a first diameter Df of 2 mm, and a maximum first indentation depth d1 of 150 μm. The graph ② is a first load-displacement curve when the maximum first indentation depth d1 was 100 μm and the other conditions are the same as those of the graph ①. The graph ③ is a first load-displacement curve when the maximum first indentation depth d1 was 50 μm and the other conditions are the same as those of the graph ①.

Referring to the graphs ① to ③, the influence of the first indentation depth d1 on the first load-displacement curves can be seen. It can be seen that the first load-displacement curves are gradually stabilized as the first indentation depth d1 increases to 100 μm and 150 μm in comparison to the case in which the first indentation depth d1 is 50 μm.

When the first indentation depth d1 is 50 μm, it is not enough to planarize the rough surface 10, so it may have considerably high surface roughness and non-uniform residual stress distribution. Accordingly, it can be seen that the influence of the surface roughness on the first load-displacement curve can be reduced by performing the first indentation step S100 while increasing the first indentation depth d1 up to the maximum first indentation depth d1 that is required to planarize the rough surface 10.

Figure 5A:
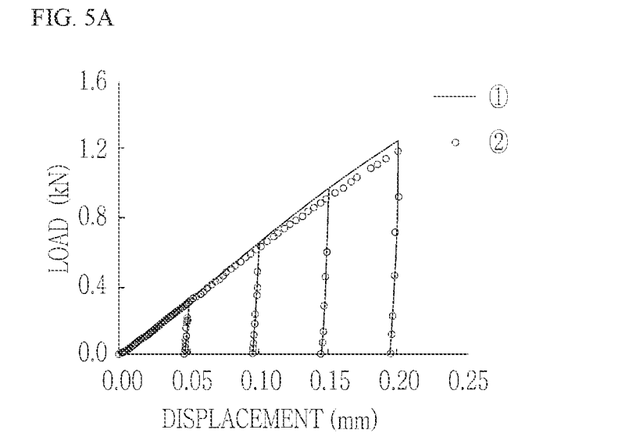
FIG. 5A, 5B, 5C are a view comparing first load-displacement curves according to the diameters of flat first indenters in the dual indentation test method according to the first embodiment of the present disclosure.
Figure 5B:
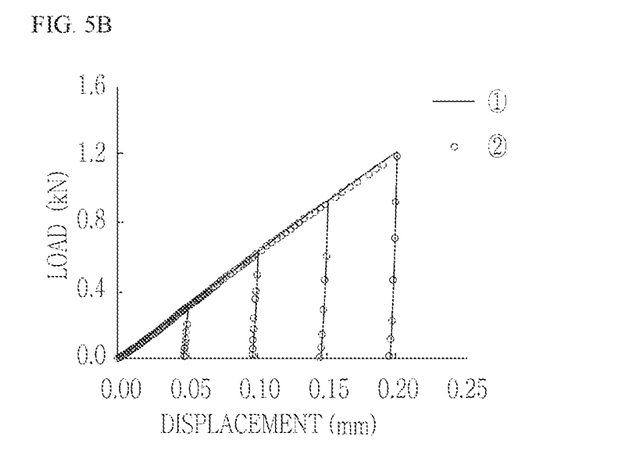
Figure 5C:
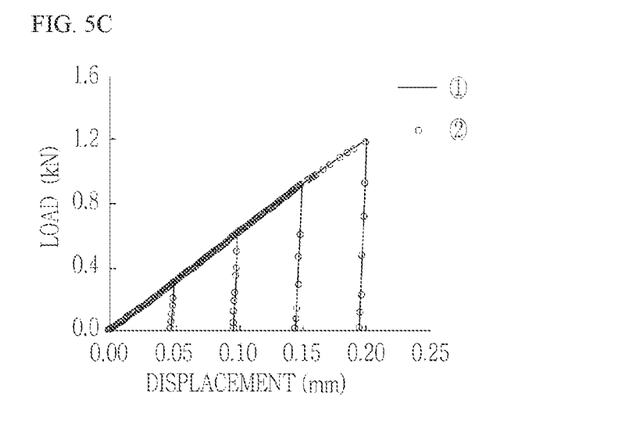

FIG. 5A, 5B, 5C are a view comparing first load-displacement curves according to a flat first diameter Df in the dual indentation test method according to the first embodiment of the present disclosure.

Referring to FIG. 5A to 5C, in FIG. 5A, the graph ① is a first load-displacement curve when the first indentation step S100 and the second indentation step S200 were performed on a smooth surface and the graph ② is a first load-displacement curve when the second indentation step S200 was performed on a smooth surface under the condition that the elastic limit stress was 400 MPa, the strain hardening exponent 'n' was 10, and the maximum first indentation depth d1 was 100 μm. Only the first diameter Df was changed into 3 mm in FIG. 5B under the same condition as FIG. 5A. Only the first diameter Df was changed into 4 mm in FIG. 5C under the same condition as FIG. 5A.

Referring to FIGS. 5A to C, influence of the first diameter Df on the first load-displacement curve can be seen. Referring to FIG. 5A, it can be seen that when the first diameter Df is 2 mm, as the second indentation depth d2 increases, the difference between the graphs ① and ② increases. On the contrary, referring to FIGS. 5B and 5C, it can be seen that when the first diameter Df is 3, 4 mm, as the second indentation depth d2 increases, the difference between the graphs ① and ② is not large.

These differences may be generated by non-uniform residual stress distribution due to the first diameter Df that is not sufficiently large in the first indentation step S100. When the first diameter Df is not sufficiently large, a high inclination may be caused at the boundary of the rough surface 10 and the planarized surface 20 at the lower end of the first indenter 110, so the first load-displacement curve may be influenced.

Accordingly, in order to obtain a first load-displacement curve, which is similar to the first load-displacement curve of a smooth surface, from the rough surface, it is required to maintain a sufficient diameter ratio at which the first diameter Df is at least three or more times the second diameter Ds. This may be applied in the same way even if the shape of the second indenter 210 is a conical shape, a spherical shape, a pyramid shape, a Vickers shape, and a Knoop shape. However, it is possible to determine the first diameter Df in consideration of the fact that the first indentation load P1 required for obtaining a uniform first indentation depth d1 increases with an increase of the first diameter Df.

Figure 6:
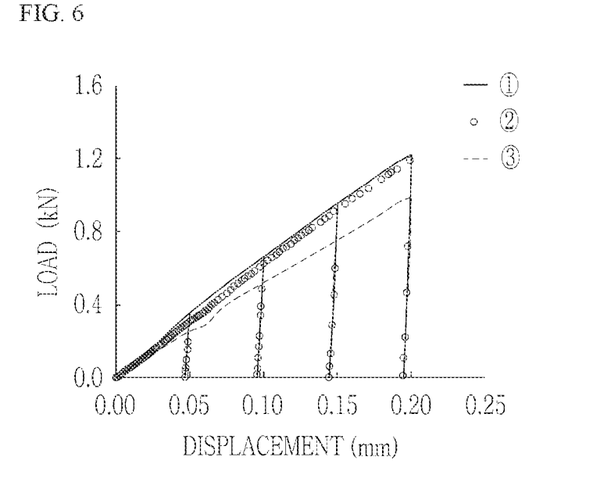
FIG. 6 is a view comparing first load-displacement curves obtained from a rough surface in the dual indentation test method according to the first embodiment of the present disclosure and a dual indentation test method not undergoing a first indentation step from a rough surface and a smooth surface.

FIG. 6 is a view comparing first load-displacement curves obtained from a rough surface in the dual indentation test method according to the first embodiment of the present disclosure and a dual indentation test method not undergoing the first indentation step S100 from a rough surface and a smooth surface.

Referring to FIG. 6, the graph ① shows a first load-displacement curve that has undergone the first indentation step S100 and the second indentation step S200 when the elastic limit stress was 400 MPa, the strain hardening exponent 'n' was 10, and the first diameter Df was 3 mm. The graph ② shows a first load-displacement curve that has undergone the second indentation step S200 on a smooth surface under the same conditions as the graph ①. The graph ③ shows a first load-displacement curve that has undergone the second indentation step S200 on a rough surface 10 under the same conditions as the graph ①.

It can be seen in FIG. 6 that there is a difference between the graph ① and the graph ②. It can be seen that the first load-displacement curves of the graph ①, the graph ②, and the graph ③ are the same regardless of the surface roughness in an unloading process of reducing the first indentation load P1.

The difference between the graph ① and the graph ② may be generated by existence of non-uniform residual stress remaining after the first indentation step S100, existence of residual roughness due to non-complete unevenness of the rough surface 10, and indentation existing after the first indentation step S100.

It can be seen in FIG. 6 that the graph ③ has a larger difference from the graph ② than the graph ①. Accordingly, it can be seen that it is possible to obtain reliable data in comparison to the case that has not undergone the first indentation step S100 in spite of residual stress, residual roughness, and indentation due to undergoing the first indentation step S100.

Figure 7A:
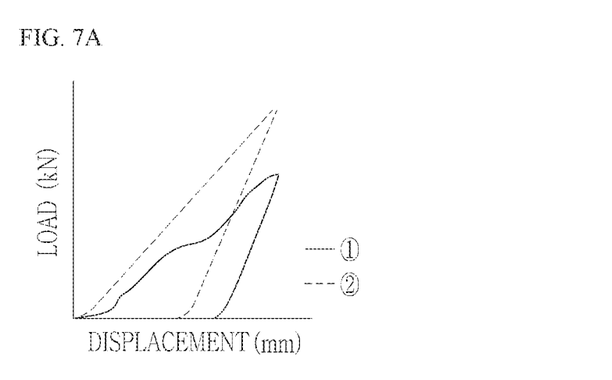
FIG. 7A, 7B are a view showing a load-displacement curve and a stress-strain curve when the first indentation step is not performed.
Figure 7B:
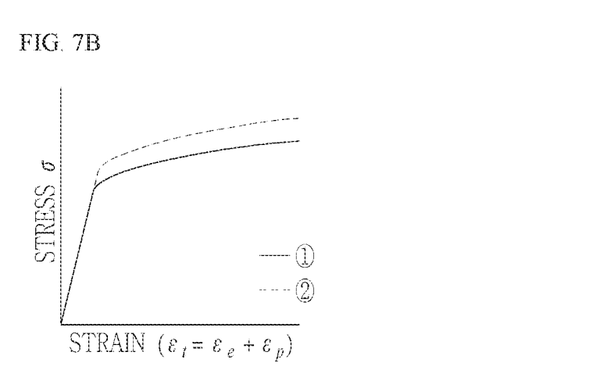
Figure 8A:
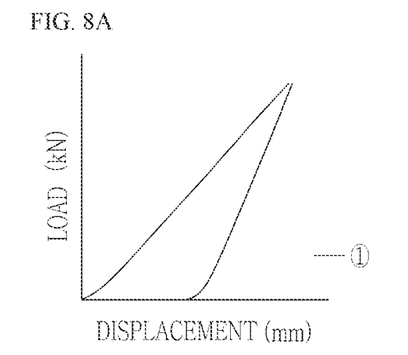
FIG. 8A, 8B are a view showing a load-displacement curve and a stress-strain curve when a second indentation step is performed after the first indentation step is performed.
Figure 8B:
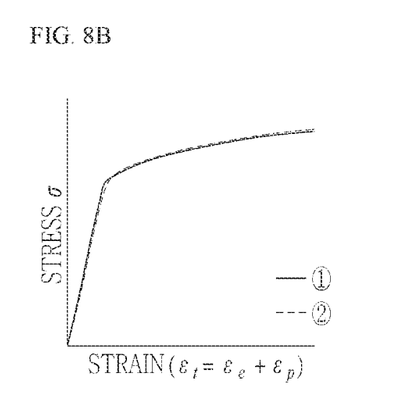

FIG. 7A, 7B are a view showing a load-displacement curve and a stress-strain curve in the case that has not undergone the first indentation step S100 and FIG. 8A, 8B are a view showing a load-displacement curve and a stress-strain curve in the case that has undergone the first indentation step S100.

Referring to FIGS. 7A 7B, 8A and 8B, it can be seen that the shapes of the first load-displacement curve and the stress-strain curve are changed in accordance with whether it has undergone the first indentation step S100. In FIG. 7A, the graph ① shows a first load-displacement curve on the rough surface 10 and the graph ② shows a second load-displacement curve on a smooth surface. In this case, the second load-displacement curve is a curve obtained by continuously measuring load and displacement while indentation of the second indentation step S200 is performed by performing the second indentation step S200 on a smooth and ideal surface. In FIG. 7B, the graph ① shows a first stress-strain curve in an indentation test that has undergone the second indentation step S200 and the graph ② shows a second stress-strain curve in a tension test.

The graph ① of FIG. 8A shows a first load-displacement curve of a planarized surface. In FIG. 8B, the graph ① shows a first stress-strain curve in an indentation test that has undergone the first indentation step S100 and the second indentation step S200 and the graph ② shows a second stress-strain curve in a tension test.

In the load-displacement curve, it can be seen that the graph ① in the case that has not undergone the first indentation step S100 (see FIG. 7A) is formed in an irregular shape and is considerably different from the graph ② that is the ideal second load-displacement curve that is indicated by a dotted line. On the contrary, it can be seen that the graph ① of the case that has undergone the first indentation step S100 (see FIG. 8A) is more stable and the difference from the ideal second load-displacement curve of the smooth surface was decreased.

In the stress-strain curve, in the case that has not undergone the first indentation step S100 (see FIG. 7B), the difference of the graph ① that is the first stress-strain curve from the graph ② that is the second stress-strain curve is large. In the case that has undergone the first indentation step S100 (see FIG. 8B), it can be seen that the difference of the graph ① that is the first stress-strain curve from the graph ② that is the second stress-strain curve in the tension test was decreased.

Hereafter, a dual indentation test method according to a second embodiment of the present disclosure is described.

Figure 9:
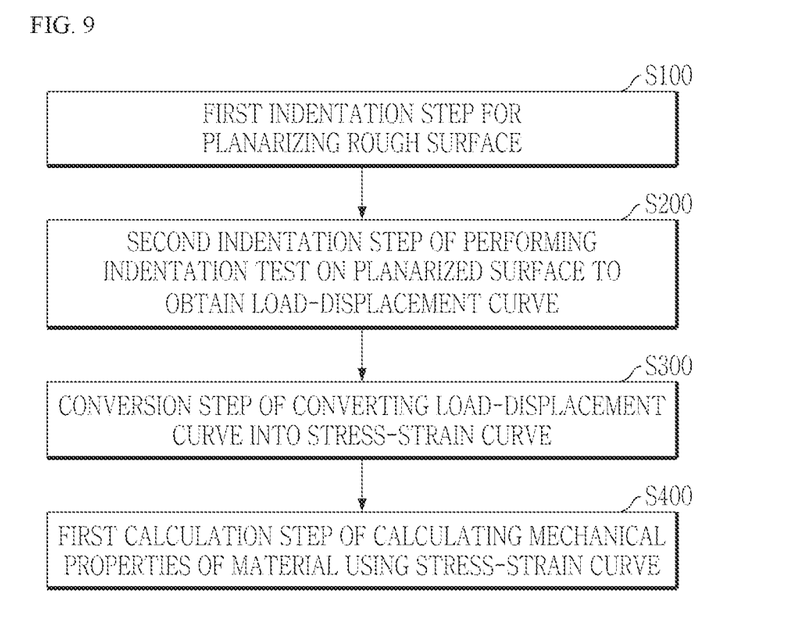
FIG. 9 is a flowchart showing a dual indentation test method according to a second embodiment of the present disclosure.

FIG. 9 is a flowchart showing a dual indentation test method according to a second embodiment of the present disclosure.

Referring to FIG. 9, the dual indentation test method according to a second embodiment of the present disclosure may be performed in the sequence of a first indentation step S100, a second indentation step S200, a conversion step S300, and a first calculation step S400. In this case, it would be understood by those skilled in the art that common steps other than the steps shown in FIG. 9 may be further included.

Since the dual indentation test method according to the second embodiment of the present disclosure is composed of the same steps as the dual indentation test method according to the first embodiment except for the conversion step S300 and the first calculation step S400, repeated description of the same steps is omitted.

The conversion step S300 is a step of converting the first load-displacement curve obtained through the second indentation step S200 into a first stress-strain curve. The reason of converting the first load-displacement curve into a first stress-strain curve is that it is easy to calculate mechanical properties of a material using the first stress-strain curve. When converting the load-displacement curve into a first stress-strain curve, it is possible to convert the curve on the basis of an existing indentation method for evaluating material physical properties developed on the basis of a smooth surface such as reverse analysis. Referring to FIGS. 4 to 6, in the dual indentation test method that has undergone the first indentation step S100 and the second indentation step S200, the test result is not greatly different from the dual indentation test of a smooth surface, so it is possible to use the existing indentation method for evaluating material physical properties developed on the basis of a smooth surface.

The first calculation step S400 is a step of calculating mechanical properties of a material using the first stress-strain curve obtained through the conversion step S300. It is possible to calculate mechanical properties such as a Young's modulus E, elastic limit stress, and hardness H from the first stress-strain curve through the first calculation step S400. For example, the Young's modulus E can be calculated as the inclination of a region (elastic region) in which the first stress-strain curve is linear. The elastic limit stress can be calculated as the stress at the boundary across which the region (elastic region) in which the first stress-strain curve is linear goes to a region (plastic region) in which the curve is curved. The hardness H can be calculated from the maximum second indentation load P2 and the size of a residual indent remaining on the planarized surface 20.

Hereafter, a dual indentation test method according to a third embodiment of the present disclosure is described.

Figure 10:
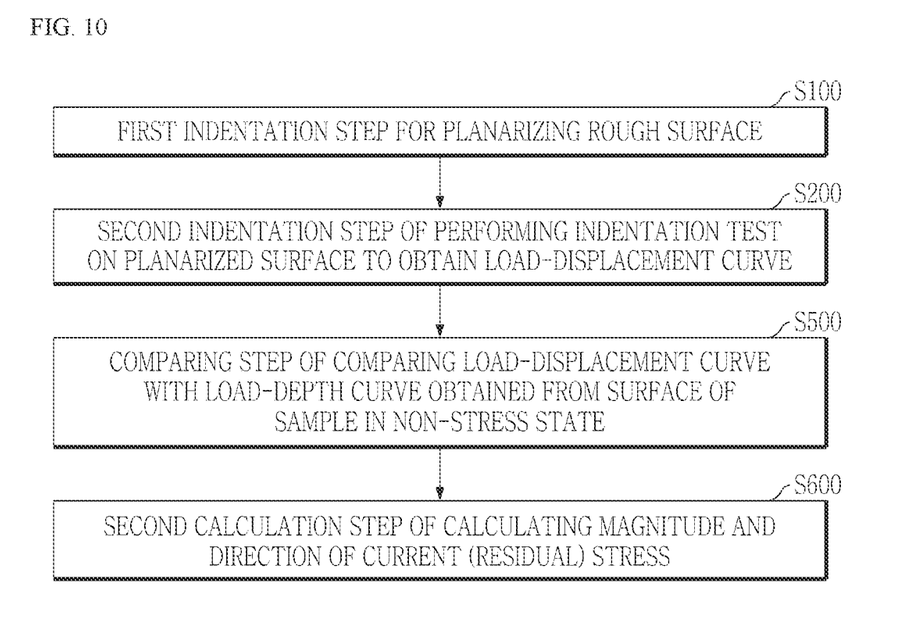
FIG. 10 is a flowchart showing a dual indentation test method according to a third embodiment of the present disclosure.
Figure 11:
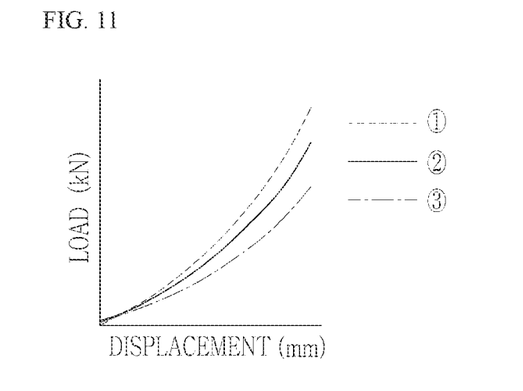
FIG. 11 is a graph comparing first load-displacement curve of a sample having residual stress distribution and a sample not having residual stress distribution.

FIG. 10 is a flowchart showing a dual indentation test method according to a third embodiment of the present disclosure and FIG. 11 is a graph comparing first load-displacement curve of a sample having residual stress distribution and a sample not having residual stress distribution.

Referring to FIG. 10, the dual indentation test method according to a third embodiment of the present disclosure may be performed in the sequence of a first indentation step S100, a second indentation step S200, a comparing step S500, and a second calculation step S600. In this case, it would be understood by those skilled in the art that common steps other than the steps shown in FIG. 10 may be further included.

Since the dual indentation test method according to the third embodiment of the present disclosure is composed of the same steps as the dual indentation test method according to the first embodiment except for the comparing step S500 and the second calculation step S600, repeated description of the same steps is omitted.

The comparing step S500 can compare a first load-displacement curve with a second load-displacement curve measured from a surface of a material in a non-stress state. In the comparing step S500, it is possible to evaluate the difference amount and direction of the first load-displacement curve and the second load-displacement curve.

Referring to FIG. 11, the graph ① is a first load-displacement curve when compression residual stress exists, the graph ② is a first load-displacement curve when residual stress does not exist, and the graph ③ is a first load-displacement curve when tension residual stress exists. It can be seen that the graph ① has a large load value for the same displacement in comparison to the graph ②. It can be seen that the graph ③ has a small load value for the same displacement in comparison to the graph ②.

The second calculation step S600 can calculate the direction and magnitude of stress by comparing a first load-displacement curve with a second load-displacement curve. In the second calculation step S600, it is possible to calculate the magnitude and direction of residual stress and current stress using the difference amount and direction of the first load-displacement curve and the second load-displacement curve evaluated in the comparing step S500. Referring to FIGS. 4 to 6, in the dual indentation test method that has undergone the first indentation step S100 and the second indentation step S200, the test result is not greatly different from the dual indentation test of a smooth surface, so it is possible to use the existing residual stress evaluation method developed on the basis of a smooth surface.

Although an embodiment of the present invention was described above, those skilled in the art may change and modify the present disclosure in various ways by adding, changing, or removing components without departing from the spirit of the present disclosure described in claims, which should be understood as being included in the scope of the present disclosure.

DETAILED DESCRIPTION OF MAIN ELEMENTS

10: rough surface
20: planarized surface
S100: first indentation step
S200: second indentation step
S300: conversion step
S400: first calculation step
S500: comparing step
S600: second calculation step

What is claimed is:

1. A dual indentation test method comprising:
   a first indentation step of indenting a surface of a material using a flat first indenter, wherein the first indenter has a cylindrical shape with a flat end; and
   a second indentation step of indenting the surface of the material within a residual imprint of the first indentation step using a second indenter.

2. The dual indentation test method of claim 1, wherein the second indenter is different in shape from the first indenter.

3. The dual indentation test method of claim 1, wherein a first load-displacement curve is obtained through the second indentation step.

4. The dual indentation test method of claim 1, wherein the first indenter and the second indenter are higher in rigidity, strength, and hardness than the material.

5. The dual indentation test method of claim 1, wherein the second indenter is different in shape from the first indenter, wherein the first indenter has a diameter that is at least three or more times a diameter of the second indenter.

6. The dual indentation test method of claim 1, wherein a plurality of first load-displacement curves are obtained by repeatedly performing the first indentation step and the second indentation step at least two or more times.

7. The dual indentation test method of claim 6, wherein an indentation load and indentation displacement in the first indentation step are configured to be changed in accordance with an error range by comparing the plurality of first load-displacement curves.

8. The dual indentation test method of claim 7, further comprising a conversion step of converting each of the plurality of first load-displacement curves into a stress-strain curve.

9. The dual indentation test method of claim 8, further comprising a first calculation step of calculating properties of the material from the stress-strain curve.

10. The dual indentation test method of claim 6, further comprising a comparing step of comparing each of the plurality of first load-displacement curves with a plurality of second load-displacement curves measured from a stress-free surface of the material in a unstressed state, further comprising a second calculation step of calculating a magnitude of stress.

* * * * *